United States Patent Office 3,669,622
Patented June 13, 1972

---

3,669,622
PROCESS FOR THE PREPARATION OF CONDENSED PHOSPHATES
Dietmar Zobel, Wittenberg, Germany, assignor to VEB Stickstoffwerk Piesteritz, Wittenberg Lutherstadt, Germany
No Drawing. Filed Nov. 3, 1969, Ser. No. 873,649
Int. Cl. C01b 25/30, 25/38
U.S. Cl. 23—107          8 Claims

ABSTRACT OF THE DISCLOSURE

Condensed phosphates are prepared by heating in the presence of air, at a temperature of 350°–500° C., a mash of orthophosphates containing up to 40% mole of phosphite, keeping the gram atom Na:P ratio between 3:2 and 2:1 and adding up to 1% mole of concentrated nitric acid or a nitrate salt. The product is of improved color. The process is preferably conducted by recycling the products.

BACKGROUND OF THE INVENTION

This invention relates to an improved process for the preparation of condensed phosphates and is particularly advantageous in connection with the processes in which revolving tubular furnaces are used and which are conducted by recycling the products.

The disproportionation of disodium phosphite $Na_2HPO_3$ by heating in a nitrogen atmosphere or in air to give a mixture of tetrasodium diphosphate $Na_4P_2O_7$, trisodium phosphate $Na_3PO_4$, as well as reddish-brown phosphorus containing residues is well known in the art. Although it is known that $Na_4P_2O_7$ is always formed as the main product, the reaction mixture acquires more or less a reddish-brown color, and the course of the reaction cannot be explained in full detail.

It is also known that all orthophosphate mash, $Na_2HPO_4$, with a high content of phosphite, $Na_2HPO_3$, that is with a molar ratio of $Na_2HPO_3:Na_2HPO_4 \leq 1$, as well as an orthophosphate mash free of phosphite, under specified conditions, may be converted to $Na_4P_2O_7$. It has been found that it is advantageous to recycle the products. These reactions may be represented by the following equations:

$$Na_2HPO_3 + Na_2HPO_4 \rightarrow Na_4P_2O_7 + H_2$$

$$NaH_2PO_3 + Na_3PO_4 \rightarrow Na_4P_2O_7 + H_2$$

These reactions begin at a temperature of 250° C. and take place gradually but preferably they occur at at least 400° C. If the reaction is allowed to proceed at a temperature of 600° C.–900° C., the product is pure white.

It is also known to utilize $Na_2HPO_3$ alone or together with $NaH_2PO_2$, or the latter alone, for the preparation of $Na_4P_2O_7$ or of pentasodium triphosphate. In this process, these substances are added in small amount, between 0.03% up to 5%, by weight specifically 1%, to an orthophosphate mash. There are obtained in the spray tower products particularly with low density, that is 400 g./l. Here the substances containing phosphorus with a low valence are completely converted into compounds containing pentavalent phosphorus.

The disproportionation of pure $Na_2HPO_3$ in actual practice is not suitable for the industrial preparation of $Na_4P_2O_7$, that is tetrasodium diphosphate. Independently from the course of the reaction, the diphosphate is the main product. This material, however, is totally useless for industrial applications because usually 10% of the phosphite phosphorus, and in some instances up to 20%, is converted during a typical disproportionation reaction, into substantially water-insoluble red brown substances. The phosphite reacts in air only by heating at temperatures much higher than the temperature required for the reaction of $$2Na_2HPO_4 \rightarrow Na_4P_2O_7 + H_2O$$

In actual practice, the process has been conducted at high temperatures sufficient to give a partial combustion of the by-products which are similar to red phosphorus, so that the color becomes gradually lighter.

Several erroneous assumptions have been made with respect to the preparation of $Na_4P_2O_7$ from an orthophosphate mash with a high phosphite content, that is with the molar ratio $Na_2HPO_3:Na_2HPO \leq 1$. Some investigators have assumed that the reaction proceeds according to the following equation:

$$Na_2HPO_3 + Na_2HPO_4 \rightarrow Na_4P_2O_7 + H_2$$

Other investigators have literally stated that it is advantageous if the dialkali phosphate is in slight excess over the calculated amount, so that phosphite formation is avoided. Our experimental work shows that the preparation of tetrasodium diphosphate from $Na_2HPO_4$ according to the processes known in the art does not proceed well, even when a considerable excess of the substance is used.

It has also been found that when the molar ratio $Na_2HPO_3:Na_2HPO_4$ is, for instance, 0.5 or 0.33, the disproportionation of the phosphite is not suppressed, and reddish brown products are formed, which have a high content of water insoluble materials. It has been customary for the purpose of obtaining a colorless product, to heat the reactants to a temperature of 600°–900° C., usually 800°–900° C., for about 20 minutes. This high temperature has been necessary for several reasons. First of all, the by-products with a gray color which are due to the presence of carbon particles resulting from the decomposition of organic materials, may be avoided. Even more important, it is possible to avoid the formation of the colored phosphorous containing residues which are similar to red phosphorus, because these substances at the high temperature undergo combustion. Thus, the significance of this process of disproportionation of the pure phosphite is a dilution of the mass of the disodium phosphate as well as the tetrasodium diphosphate, when the products are recycled.

Manifestly this process for the preparation of condensed phosphates is accompanied by several drawbacks. In addition to the high energy required, the apparatus presents difficulties, because the revolving tubular furnace has been made conventionally of ordinary steel, has no lining, and high temperature should be avoided. The process discussed for the preparation of condensed phosphates of low density is of no direct significance chiefly because it is only applicable to $Na_2HPO_3 \cdot 5H_2O$, in the proportion of 0.4–1%. At this high dilution, it would be hardly noticeable if the reaction of conversion of $P^3$ to $P^5$ were not complete and if slightly colored products were formed.

SUMMARY OF THE INVENTION

One object of this invention is to prepare condensed phosphates which is economical and suitable for industrial applications. Another object is to prepare condensed phosphates from solutions of phosphites, such as alkaline phosphorus containing sludges or from solutions obtained as by-products by the neutralization of phosphorous acid with sodium hydroxide or sodium carbonate.

Another object of this invention is to prepare condensed phosphates from an orthophosphate mash of high phosphite content in such a manner that the final product is not different from the products ordinarily obtained according to the equation $$2Na_2HPO_4 \rightarrow Na_4P_2O_7 + H_2O$$

Still another object of this invention is to carry out the preparation of condensed phosphates at temperatures conventionally used for the production of tetrasodium diphosphate or pentasodium triphosphate from an orthophosphate mash free of phosphites that is, about 350°–500° C., and particularly 350°–400° C. The reaction according to known processes, has been conducted at much higher temperatures, that is 600°–900° C.

The crux of this invention resides in the finding that if nitric acid, or another inorganic nitrogenous compound in the anhydrous form, is used, it is possible to conduct the process from an orthophosphate mash with up to 40 mole percent, preferably up to 25 mole percent of phosphites, calculated on the basis of the total phosphite and phosphate phosphorous at a temperature in the range of the temperatures conventionally used for the process from orthophosphates free of the phosphites. The molar amount of $HNO_3$ is 0.04–1%. The final product in accordance with the process of this invention, is not different from the condensed phosphates obtained from a pure orthophosphate mash, that is, it is free of phosphites and free of substances which could undergo reduction. The product in accordance with this invention, is not different in degree of whiteness from conventional condensed phosphates.

Within the scope of the process of this invention, 40% phosphite content refers to a phosphite-phosphorus based upon the sum of phosphite and phosphate phosphorus. The inorganic nitrogenous compound is dehydrated before use and the nitric acid is concentrated nitric acid of commerce.

The gram-atom ratio of Na:P in the starting material in the process according to this invention may be varied, depending upon the desired degree of purity of the final product. Thus it may range from 3:2 when hexasodium tetraphosphate is desired to 2:1, when tetrasodium diphosphate is desired. In some instances, the gram-atom ratio Na:P may also be 2:3, in which case naturally, a variable amount of $Na_3PO_4$, in the form of uncondensed orthophosphates is found in the final product, which may be removed.

According to a specific embodiment of this invention, it is possible to substitute for the phosphite, in part or totally a hypophosphite if the gram-atom ratio Na:P is adjusted to 2, by addition to the appropriate amount of sodium hydroxide. During the course of the reaction, the hypophosphite loses hydrogen according to a known reaction, and is converted into the phosphite.

The disproportionation of the phosphite cannot be avoided in accordance with the process of this invention. The function of the nitric acid or the nitrates, however, is to lower the temperature required for the disproportionation. Another function of the nitric acid and the nitrates, among others, is to permit to obtain the by-products of the disproportionation which are similar to red phosphorus and water-insoluble in an active form. In this manner, the combination of these substances occur practically immediately, with the reaction vessel being heated by gas heaters operated with excess of air. It cannot be said with certainty whether the nitrate at this last stage, which has not completely reacted, performs a direct role. The phosphorous pentoxide which is formed reacts directly with the reaction mixture, so that the initial Na:P ratio as a whole is restored.

Our studies have shown that, if the nitric acid addition is omitted, comparable results may be achieved only at temperatures between 600° and 900° C. In addition to the lower temperature the reaction time, about 20 minutes, is particularly favorable. Finally, in accordance with this invention leakage of the phosphorous pentoxide, $P_2O_5$, does not occur and its total absorption is advantageous because the reaction products are recycled in the revolving furnace.

Our studies show with certainty that the process of this invention does not involve the reaction represented by the following equation $$Na_2HPO_3 + Na_2HPO_4 \rightarrow Na_4P_2O_7 + H_2$$

On the contrary, hydrogen which is formed during the thermal reaction of samples of disodium phosphate containing phosphite, originates exclusively from the phosphite portion.

The invention is further clarified by reference to the following examples, and specifically, A, B and C, which refer to conventional processes known in the art, and Examples 1–6 which refer to the novel process of this application.

Procedure A

Samples of crystalline, anhydrous pulverized mixtures of disodium phosphite and disodium phosphate with a $P^{+3}:P^{+5}$ ratio of 1:1, 1:2 and 1:3, were heated in a tubular furnace, heated by a stream of air at a temperature between 250° and 900° C., for a period of 1 hour. After completion of the reaction, the reaction mixture was removed from the reaction vessel and when necessary, pulverized. The ability of each reaction mixture of particle size about 0.12 mm. to reflect polychromatic light, was then determined in all the tests. When the reflection alone, based on the percent of light reflected, could not be determined, because of the color of the reaction products, the appearance of the samples was noted. It became apparent that the samples were colored, due to the presence of the brownish-red products of disproportionation, rather than because of impurities.

The results are summarized in Table 1. The results demonstrate that it is not possible to obtain colorless product even with considerable excess of phosphate, over a wide temperature range.

The reaction of the phosphite is not complete unless the temperature is about 500° C. The products become deeper in color with increase in temperature, and only at a temperature above 600° C., the products begin to lighten in color, because of partial combustion of disproportionation products similar to red phosphorus. Pure white products begin to be formed at about 900° C. The water-insoluble disporportionation products, which are formed in substantial amounts, are difficult to detect directly because on washing the filter-cake they are washed away as colloidal materials. For this reason, data obtained in this fashion are not presented.

The results have led to the conclusion that this process is not satisfactory. It has been established that the content of water-insoluble substances increases with the decrease of the degree of whiteness. It has also been established that the reaction products consist of $Na_4P_2O_7$, $Na_3PO_4$ and of water-insoluble materials at a temperature above 500° C. When the filter-cake is not washed, and the ratio of $P_2O_7^{-4}:PO_4^{-3}$ is determined in the filtrate containing water-soluble products, it is concluded that more than 10% of reacted material containing $P^{+3}$ is lost in the form of compounds similar to red phosphorus.

TABLE 1.—THERMAL REACTION OF PHOSPHITE CONTAINING PHOSPHATE SAMPLES IN THE AIR

| Composition of the reaction mixture in moles | Reaction temperature in °C. | Color of products | Whiteness of products in percent | $P^3$ content of the reaction products in moles percent |
|---|---|---|---|---|
| $Na_2HPO_3 + Na_2HPO_4$ ($P^3:P^5=1.0$) | 250 | White | 90.5 | 10.5 |
| | 300 | Light tan | 83.5 | 10.1 |
| | 350 | do | 86.0 | 8.5 |
| | 400 | Light brown | 48.5 | 3.9 |
| | 500 | Brown | 40.0 | 0.8 |
| | 600 | do | 43.0 | |
| | 700 | Light brown | 53.0 | |
| | 800 | Light gray | 80.0 | |
| | 900 | White | 89.0 | |
| $Na_2HPO_3 + 2Na_2HPO_4$ ($P^3:P^5=0.50$) | 250 | White | 91.0 | 7.5 |
| | 300 | Light tan | 86.0 | 6.5 |
| | 350 | do | 85.0 | 3.5 |
| | 400 | do | 78.5 | 1.0 |
| | 500 | Light brown | 52.5 | 0.6 |
| | 600 | do | 62.0 | |
| | 700 | Gray | 71.0 | |
| | 800 | | 71.5 | |
| | 900 | White | 89.0 | |
| $Na_2HPO_3 + 3Na_2HPO_4$ ($P^3:P^5=0.33$) | 250 | White | 91.0 | 5.6 |
| | 300 | do | 87.0 | |
| | 350 | do | 88.0 | 3.5 |
| | 400 | Light brown | 65.0 | 1.0 |
| | 500 | do | 63.5 | 0.5 |
| | 600 | Gray | 64.0 | |
| | 700 | Light gray | | |
| | 800 | do | 66.0 | |
| | 900 | White | 94.0 | |

Procedure B

A mixture of $Na_2HPO_3 \cdot 5H_2O$ and $Na_2HPO_4 \cdot 12H_2O$ was heated to 200 C. to remove the water, then pulverized and well mixed with $Na_4P_2O_7$, similarly pulverized. This series of experiments served to simulate the recycling stage. The experimental conditions were the same as in Procedure A. It should be noted, however, that direct comparison between this series of experiments in which the ratio of the constituents was fixed and other processes, is not possible.

The results, summarized in Table 2 below, show that this variation of the method is not advantageous, except that the minimum degree of whiteness occurs at a somewhat lower temperature by comparison with the experiments in which no diphosphate was used. In other respects, the recycling of the reaction products appeared to serve as a means of diluting the reaction mixture.

The gas formed in the reaction contained 3.11 mg. of molecular hydrogen, calculated as water. The red-brown solid residue was free from phosphite and contained 39.3% of $P_2O_5$ in the form of $Na_4P_2O_7$ and 10% of $P_2O_5$ in the form of $Na_2PO_4$. Since the total $P_2O_5$ content calculated by oxidation and hydrolysis was 54.6%, the results show the loss of 5.3% of $P_2O_5$. This was explained as due to the presence of phosphorus containing red-brown disproportionation products. The direct determination of these substances in the water-insoluble portion, did not lead to significant findings. It was ascertained, however, that the reaction $$Na_2HPO_3 + Na_2HPO_4 \rightarrow Na_4P_2O_7 + H_2$$

can be excluded, because in theory, 7.46 mg. of hydrogen would form per gram of the anhydrous mixture $$Na_2HPO_3 + Na_2HPO_4$$

TABLE 2.—THERMAL REACTION OF EXAMPLES OF PHOSPHATES CONTAINING PHOSPHITES, TOGETHER WITH $Na_4P_2O_7$ IN THE AIR TO SIMULATE THE RECYCLING STAGE

| Composition of the reaction mixture in moles | Reaction temperature in °C. | Color of reaction products | Whiteness of the products in percent |
|---|---|---|---|
| $Na_2HPO_3 + Na_2HPO_4 + Na_4P_2O_7$ ($P^3:P^5:P^5-O-P^5=1:1:1$) | 200 | White | 94.5 |
| | 250 | do | 89.3 |
| | 300 | Yellowish | 62.1 |
| | 350 | Brown | 45.5 |
| | 400 | do | 49.1 |
| | 450 | do | 53.5 |
| | 500 | do | 59.4 |
| | 550 | Yellowish | 61.8 |
| | 600 | do | 65.0 |
| $Na_2HPO_3 + 2Na_2HPO_4 + 1.5Na_4P_2O_7$ ($P^3:P^5:P^5-O-P^5=1:2:1.5$) | 200 | White | 95.3 |
| | 250 | Yellowish | |
| | 300 | Light brown | 63.6 |
| | 350 | do | 64.3 |
| | 400 | do | 68.2 |
| | 450 | do | 65.4 |
| | 500 | Beige | 75.3 |
| | 550 | do | 76.6 |
| | 600 | do | 84.7 |

Procedure C

A mixture of equimolar quantities of $Na_2HPO_4 \cdot 12H_2O$ and $Na_2HPO_3 \cdot 5H_2O$ was heated to 200° C. to remove the water and finely pulverized.

A sample of 1 g. of the substance was heated 2 hours at 500° C. in an atmosphere of dry nitrogen after which the gaseous and the solid reaction products were analyzed.

The results with the analysis of solid materials unquestionably demonstrate that thermolysis of $Na_2HPO_3$ proceeds in a normal fashion, in spite of the presence of $Na_2HPO_4$.

EXAMPLE 1 (ACCORDING TO THIS INVENTION)

A mixture of $Na_2HPO_3 \cdot 5H_2O$ and $Na_2HPO_4 \cdot 12H_2O$ in different ratios was heated in the presence of $NaNO_3$ at 200° C. to remove water. The crystalline anhydrous material was pulverized and heated 1 hour at a temperature between 250° and 800° C. in a tubular furnace in a current of air. The results are summarized in Table 3 below.

Obviously the same effect can be achieved if instead of $NaNO_3$, $HNO_3$ is used after proper adjustment of the Na:P ratio with sodium hydroxide.

At a temperature of 400° C., the $P^3$ was gradually completely reacted to form —P—O—P—.

TABLE 4.—THERMAL REACTION OF SAMPLES OF PHOSPHATES CONTAINING PHOSPHITES, IN THE PRESENCE OF NITRIC ACID

| Composition of the reaction mixture in moles | Reaction temperature in °C. | Color of the reaction products | Percent whiteness of the reaction products | Content of $P^3$ in the reaction product in percent |
|---|---|---|---|---|
| $Na_2HPO_3.5H_2O+$ | 350 | Yellow | 62.0 | 0.37 |
| $3Na_2HPO_4.12H_2O+$ | 400 | do | 66.9 | 0.22 |
| 0.04% $HNO_3$ by weight.[a] | 450 | Brownish | 68.8 | 0.06 |
|  | 500 | do | 75.1 |  |
|  | 550 | do | 71.5 |  |
|  | 600 | do | 78.5 |  |
| $Na_2HPO_3.5H_2O+$ | 350 | Yellowish | 89.3 | 0.05 |
| $3Na_2HPO_4.12H_2O+$ | 400 | White | 91.8 | 0.02 |
| 1% $HNO_3$.[a] | 450 | do | 92.0 |  |
|  | 500 | do | 92.0 |  |
|  | 550 | do | 92.8 |  |
|  | 600 | do | 92.1 |  |
| $Na_2HPO_3.5H_2O+$ | 350 | White | 92.9 | 0.06 |
| $3Na_2HPO_4.12H_2O+$ | 400 | do | 93.6 | 0.02 |
| 1% $HNO_3$.[a] | 450 | do | 94.6 |  |
|  | 500 | do | 95.0 |  |
|  | 550 | do | 95.2 |  |
|  | 600 | do | 95.7 |  |

[a] Anhydrous.

TABLE 3.—THERMAL REACTION OF SAMPLES OF PHOSPHATES CONTAINING PHOSPHITES IN THE AIR

| Composition of the reaction mixture in moles | Reaction temperature in °C. | Color of the products | Whiteness of reaction products | Percent by weight of $P^3$ in product |
|---|---|---|---|---|
| $Na_2HPO_3+Na_2HPO_4+2/10NaNO_3$ | 250 | White | 93.0 | 10.4 |
| ($P_3:P_5=1:1$; Na:P=2.1:1) | 300 | do | 87.5 | 10.2 |
|  | 350 | do | 89.0 | 6.0 |
|  | 400 | Yellowish | 83.5 | 0.3 |
|  | 500 | do | 86.0 |  |
|  | 600 | White | 91.5 |  |
|  | 700 | do | 95.0 |  |
|  | 800 | do | 97.0 |  |
| $Na_2HPO_3+2Na_2HPO_4+3/10NaNO_3$ | 250 | White | 92.5 | 7.6 |
| ($P^3:P^5=1:2$; Na:P=2.1:1) | 300 | do | 90.0 | 7.5 |
|  | 350 | do | 93.0 | 2.1 |
|  | 400 | do | 88.5 | 0.2 |
|  | 500 | do | 91.0 |  |
|  | 600 | do | 96.0 |  |
|  | 700 | do | 98.0 |  |
|  | 800 | do | 98.0 |  |

The results compared with the data in Table 1, unquestionably demonstrate the advantages achieved due to the addition of sodium nitrate, mainly it accelerates the reaction of the phosphite and favorably affects the degree of whiteness of the product. With a ratio of $P^3:P^5$ or 1:1, the minimum degree of whiteness is at about 400° C.

In view of the fact that in all the experiments the ratio of Na:P is affected by the presence of $NaNO_3$, all the reaction products contain naturally, a part of the orthophosphate $Na_3PO_4$ which has not undergone condensation.

A beneficial effect is similarly achieved if instead of $NaNO_3$, $HNO_3$ is adjusted by means of NaOH, to the same value as in previous preparation.

EXAMPLE 2

A mixture of $Na_2HPO_3.5H_2O$ and $Na_2HPO_4.12H_2O$, in the molar ratio of 1:3 respectively, was heated at 200° C. in the presence of $HNO_3$. The nitric acid was concentrated, that is 100%. The proportion of nitric acid specified in the table refers to the sum of the weights of the starting materials before dehydration. The dehydrated material was pulverized and heated as in Example 1. The results are summarized in Table 4.

The results undisputably show that the increase in the $NO_3$ ion content favorably affects the degree of whiteness of the product and that while with 0.04% $HNO_3$, the whiteness of the product was not appreciably affected, with 1% $HNO_3$, the degree of whiteness was at least 90%.

EXAMPLE 3

This experiment was conducted for the purpose of determining the applicability of impure phosphorous acid. The pure disodium phosphite $Na_2HPO_3.5H_2O$ employed in Examples 1 and 2 was prepared from alkaline phosphorus containing by-products available in the form of a sludge. Here there was used a fraction, containing phosphorus acid, which was a by-product in oleic acid chloride production. This fraction was purified as follows: The brownish-black material, of very bad odor, which contained substantial amounts of phosphorus trichloride, oleic acid chloride and oleic acid, was diluted to a content of $H_3PO_3$ of about 70%, and then was left to stand about 24 hours at 50° C. The bottom brownish layer was separated and decolorized with activated charcoal. After filtering off the charcoal, the resulting solution, still of a weakly yellow color and almost odorless, was combined with $H_3PO_4$ and NaOH to a $P^3:P^5$ ratio of 1:3 with a Na:P gram-atom ratio of 2:1. Then there was added nitric acid in amount of 0.2 mole per mole of $P^3$, corresponding to 1% mole of nitric acid, that is in the same molar proportion as in Example 2. The solution was then evaporated to dryness and heated in the same manner as described in Example 2. The degree of whiteness was 90% in each case.

EXAMPLE 4

A solution of 542 liters of a filtered alkaline phosphorus containing sludge, of density 1.30 g./ml., was saturated with $H_3PO_4$ of density 1.65 g./ml. The resulting solution of phosphite and hypophosphite contained 4% $P^1$, 4.45% $P^3$ and 0.80% $P^5$.

After saturation 2.1 cubic meters of a mash of density 1.52 g./ml. were obtained, the composition was:

| | Percent |
|---|---|
| $P^1$ | 0.81 |
| $P^3$ | 0.97 |
| $P^5$ | 11.10 |

Thus, 13.8% of the total phosphorous was present in the lower valence state.

In order to achieve the desired ratio ratio of Na:P of 2:1, the mash was treated with sodium hydroxide with consideration for the portion of the hypophosphite. The mash was then treated with 33 liters of 53% $HNO_3$ corresponding to 0.2 mole $HNO_3$ per mole of $P^5$. The solution was then processed in a tubular revolving furnace, that is, the apparatus ordinarily used for recycling in large scale industrial operations, for a period of 77 minutes. The results are summarized in Table 5.

TABLE 5.—REACTION OF DISODIUM PHOSPHATE, CONTAINING PHOSPHITE AND HYPOPHOSPHITE, WITH RECYCLING

| Test No. | Reaction time in minutes | Content of $P^3$ in percent | Content of water insoluble materials in percent | Degree of whiteness in percent | Content of $P^5$ orthophosphate in percent |
|---|---|---|---|---|---|
| 1 | 0 | 0.002 | 0.06 | 94.4 | 0.10 |
| 2 | 10 | 0.001 | 0.08 | 95.1 | 0.09 |
| 3 | 20 | 0.000 | 0.07 | 95.2 | 0.09 |
| 4 | 30 | 0.000 | 0.06 | 94.8 | 0.10 |
| 5 | 40 | 0.000 | 0.04 | 94.8 | 0.11 |
| 6 | 50 | 0.000 | 0.03 | 94.9 | 0.06 |
| 7 | 60 | 0.002 | 0.02 | 94.9 | 0.07 |
| 8 | 65 | 0.000 | 0.01 | 94.9 | 0.09 |
| 9 | 70 | 0.001 | 0.03 | 94.8 | 0.13 |
| 10 | 75 | 0.003 | 0.03 | 94.9 | 0.08 |
| 11 | 80 | 0.005 | 0.07 | 93.6 | 0.08 |
| 12 | 85 | 0.005 | 0.04 | 93.3 | 0.18 |
| 13 | 90 | 0.002 | 0.03 | 92.9 | 0.09 |
| 14 | 95 | 0.005 | 0.04 | 93.1 | 0.11 |
| 15 | 100 | 0.006 | 0.05 | 92.4 | 0.11 |
| 16 | 105 | 0.006 | 0.05 | 92.4 | 0.11 |
| 17 | 110 | 0.005 | 0.04 | 92.2 | 0.09 |
| 18 | 115 | 0.007 | 0.03 | 91.9 | 0.09 |
| 19 | 120 | 0.008 | 0.04 | 91.2 | 0.09 |
| 20 | 130 | | 0.05 | 92.3 | 0.09 |
| 21 | 140 | | 0.05 | | 0.10 |
| 22 | 150 | 0.007 | 0.05 | 91.0 | 0.10 |
| 23 | 160 | 0.006 | 0.06 | | 0.10 |
| 24 | 170 | 0.006 | 0.02 | 91.6 | 0.10 |
| 25 | 180 | 0.006 | 0.04 | 91.8 | 0.11 |

All the tests exhibited a degree of whiteness above 90%.

EXAMPLE 5

A disodium phosphite solution was treated with $H_3PO_4$ in the ratio of 1:6 of $P^3$:$P^5$. The solution was saturated with sodium hydroxide while the gram-atom ratio of Na:P was 3:2. This corresponded to the ratio desired for the preparation of hexasodium tetraphosphate $Na_6P_4O_{13}$. Finally 0.1 mole of $HNO_3$ per mole of $P^3$ was added.

The mash was evaporated to dryness at 200° C. on a sand bath. A portion of 50 g. of the residue was finely pulverized, placed in a porcelain dish and heated at 500° C. for 30 minutes in a muffle furnace. The Na:P gram-atom ratio was about 2, consistent with a $NaH_2PO_3$ in the form of $Na_2H_2P_2O_5$ in the starting material. Some phosphite unavoidably developed.

The reaction gases occasionally ignited on the surface of the reaction mixture. As part of the investigation, the Na:P ratio was determined continuously, but there was no detectable change.

Under the experimental conditions, there was a complete absorption of $PH_3$ formed during the reaction and combustion to form $P_2O_5$. The reaction product exhibited a degree of whiteness of 91%, was free of phosphite, and consisted of $Na_4P_2O_7$, $Na_5P_3O_{10}$, $Na_6P_4O_{13}$, $(NaPO_3)_3$ and $(NaPO_4)_4$, that is, it corresponded to the orthophosphate mash industrially available under the name of tetrapolyphosphates.

EXAMPLE 6

A phosphite-phosphate mash of $P^3$:$P^5$ ratio 1:9, and Na:P gram-atom ratio 5:3, was treated according to the procedure of Example 5. The product was not different from the pentasodium triphosphate $Na_5P_3O_{10}$, prepared from the orthophosphate mash, free of phosphite. The material was obtained in phase I (high temperature modification).

What is claimed is:

1. A process for the preparation of condensed phosphates from a mixture of sodium orthophosphates having a phosphite content of up to 40 mole percent, which comprises adjusting the Na:P gram-atom ratio of the reactants with NaOH to a value of between 3:2 and 2:1, adding concentrated nitric acid in a molar amount of between 0.04–1% and heating in air at temperature of 350°–500° C.

2. The process according to claim 1 wherein the phosphite content amounts to up to 25 mole percent.

3. The process according to claim 1, wherein the gram-atom Na:P ratio is 2:3 and uncondensed orthophosphates are removed.

4. The process according to claim 1, wherein a hypo$_5$ phosphite is used in partial or total replacement of the phosphite, the gram-atom ratio of Na:P is adjusted to 2 and the hypophosphite is converted to phosphite during the reaction.

5. The process according to claim 1, wherein the products are recycled.

6. The process according to claim 1, wherein the temperature is 350°–400° C.

7. The process according to claim 1, wherein the ratio of $P^3.P^5$ in the phosphite and orthophosphate starting material is 1:3, the Na:P gram-atom ratio is 2:1 and the molar amount of nitric acid is 1%.

8. The process according to claim 1, wherein the gram-atom ratio Na:P is 3:2, the ratio $P^3$:$P^5$ is 1:6, the amount of $HNO_3$ is 0.1 mole per mole of $P^3$ and the product consists of $Na_4P_2O_7$, $Na_{55}P_3O_{10}$, $Na_6P_4O_{13}$, $(NaPO_3)_3$ and $(NaPO_4)_4$.

References Cited

UNITED STATES PATENTS

| 2,708,619 | 5/1955 | Winnicki et al. | 23—107 |
| 3,230,041 | 1/1966 | Edwards et al. | 23—107 |

FOREIGN PATENTS

| 1,133,045 | 11/1968 | England | 23—107 |

OSCAR R. VERTIZ, Primary Examiner

C. B. RODMAN, Assistant Examiner

U.S. Cl. X.R.

71—34

UNITED STATES PATENT OFFICE
CERTIFICATE OF CORRECTION

Patent No. 3669622            Dated June 13, 1972

Inventor(s) Dietmar Zobel

It is certified that error appears in the above-identified patent and that said Letters Patent are hereby corrected as shown below:

IN THE CLAIMS:

Claim 8, line 4, change "$Na_{55}$" to -- $Na_5^{--}$ --.

Signed and sealed this 28th day of November 1972.

(SEAL)
Attest:

EDWARD M. FLETCHER, JR.            ROBERT GOTTSCHALK
Attesting Officer                 Commissioner of Patents